March 13, 1973 P. J. ALLEN 3,720,834
HIGH POWER INFRARED IMAGING DEVICE
Filed June 15, 1971 3 Sheets-Sheet 1

INVENTOR
PHILIP J. ALLEN

AGENT

ATTORNEY

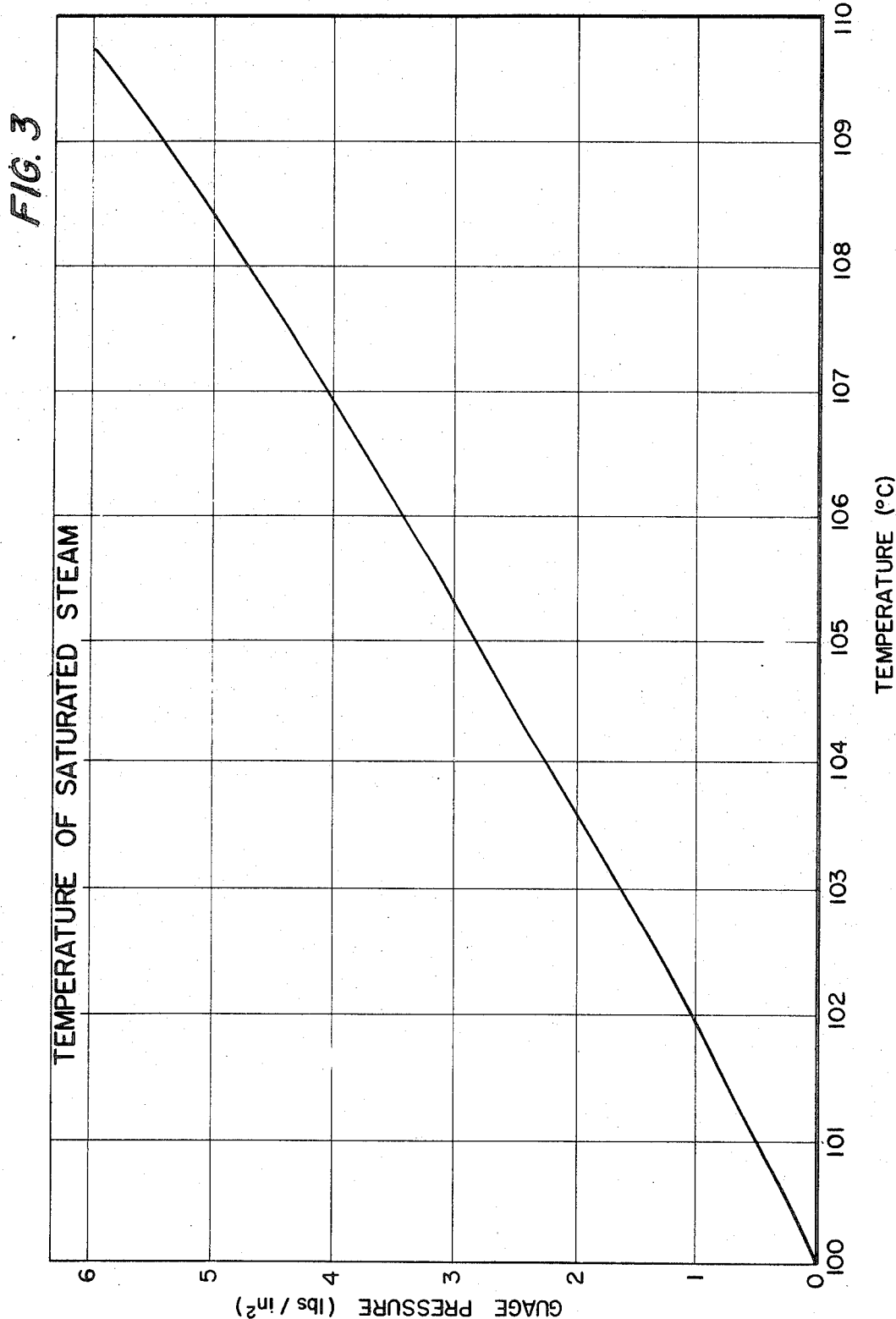

United States Patent Office 3,720,834
Patented Mar. 13, 1973

3,720,834
HIGH POWER INFRARED IMAGING DEVICE
Philip J. Allen, North Forestville, Md., assignor to the United States of America as represented by the Secretary of the Navy
Filed June 15, 1971, Ser. No. 153,325
Int. Cl. G01t 1/16
U.S. Cl. 250—83.3 H                                   4 Claims

ABSTRACT OF THE DISCLOSURE

This disclosure is directed to a liquid crystal detector for imaging high power infrared laser beams. The system includes at least one detector screen associated with a container including boiling a solution therein to maintain a constant temperature for the detector screen. The detector screen is operative to produce a visible image of incident infrared laser light. The boiling solution not only maintains a constant temperature for the liquid crystal medium but provides a means for dissipating the heat of the laser beam which further heats the solution to form a vapor or steam at a controlled constant pressure.

CROSS-REFERENCES OF RELATED PATENT APPLICATION

This invention is adapted for use with infrared detectors such as described in copending application Ser. No. 16,887 filed Mar. 5, 1970 and now Pat. No. 3,604,930 for "Method and Apparatus for Displaying Visual Images of Infrared Beams."

BACKGROUND OF THE INVENTION

This invention relates to the use of liquid crystal detectors for imaging high power infrared laser beams and more particularly to a system for improving the operation and lifetime of such detectors.

It has been determined that detectors such as described in the above mentioned patent application have a short useful life as a viewing surface due to a loss in sensitivity resulting from thermal damage from extreme temperature changes and operation at high temperature resulting from incident ultra-violet laser light. The total power handling capability is limited by the area of the detector screen and the ability to remove heat from the device so as to maintain the correct thermal bias needed for proper operation of the detector screen. Various systems for controlling temperature such as radiative heat sinks, fan cooling, and controlled temperature coolants have been used without success.

SUMMARY OF THE INVENTION

This invention is directed to a system for improving the sensitivity of infrared detectors as well as providing a significant increase in the power handling capability of liquid crystal detectors as used for observing high power laser beams. The system makes use of a liquid crystal detector which functions in the vicinity of 100° C. and employs boiling a solution to maintain a constant thermal bias temperature for the detector. The boiling solution such as water may be confined to a suitable tank with means provided for disposal of the steam or vapor generated and replenishment of the solution.

STATEMENT OF THE OBJECTS

It is therefore an object of the present invention to provide a cooling means for high power radiation detectors.

Another object is to provide a system suitable for operating infrared detectors without substantial increases in the operating temperature of the detector due to incident radiation.

Still another object is to provide a cooling system for a radiation detector which will prolong the useful life of the detector.

Yet another object is to provide a cooling system which aids in improving the sensitivity of an infrared detector as well as prolonging the life thereof.

While still another object is to provide a cooling system which will permit efficient operation of a radiation detector at a higher power than at present.

Other objects and advantages of the invention will become obvious from a review of the following specification and drawings.

BRIEF DESCRIPTION OF THE DRAWINGS

FIG. 3 illustrates a temperature vs. pressure curve for steam in a pressure system.

DESCRIPTION OF THE VARIOUS DEVICES

Figure 1:
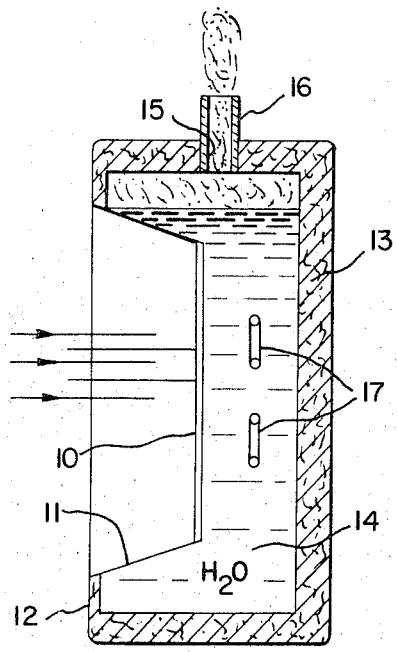
FIG. 1 is a cross sectional view illustrating the relative parts of a device made in accordance with the teaching of the invention.

Now referring to FIG. 1, there is shown by illustration a simple system for cooling a temperature-dependent radiation detector 10. Radiation detector 10 is shown mounted by any suitable means at the bottom of a conical section 11 which is secured at the outer end to a wall 12 of a cylindrical housing 13. However, the radiation detector could be secured directly to the wall 12 by omitting the conical section without departing from the invention. The housing includes an opening 15 within which a tube 16 is secured through which steam or vapor may escape and through which water or any suitable solution may be added to the housing. The housing may be formed of a suitable heat insulator material, as shown, or be provided with suitable insulation to prevent the escape of heat. An immersion heater 17 is provided to heat the water or solution to a boiling temperature prior to use as a detector.

The radiation detector element may be formed in accordance with the teaching of the copending patent application Ser. No. 16,887 filed Mar. 5, 1970, such as liquid crystal on anodized aluminum.

In operation, with the detector assembled onto the housing, the housing is filled with water or any other suitable solution and the heater is made operational to heat the water to boiling temperatures. The water is maintained at boiling temperature to heat the temperature-dependent detector to an even temperature of the water, Once the detector becomes evenly heated to the proper temperature, the system is ready for detection of radiation. Radiation is directed onto the detector and the detector will display a visible image representative of the incident radiation. Since the radiation heats the detector, the water will be heated by the detector. Therefore, at high radiation power levels, the heater 17 may be turned off and the heat for the water will be supplied by the radiation detector. As the detector heats to higher temperature more heat will be supplied to the water to boil off the water at a faster rate. Therefore, the radiation detector will remain substantially at the same temperature as the boiling water. If necessary, the heater may be thermostatically controlled for insuring a sufficiently high temperature. Because of the large heat of vaporization of water at 100° C. (540 cal./g.) and the high mobility of steam, the system is able to dissipate significant laser powers.

The device shown may be equipped with a water replenishing means as well as a pressure control means. By installation of a pressure control valve, the boiling temperature can be controlled. Thus, the temperature of the detector may be raised by increasing the steam pressure. Likewise, the device could be operated at a reduced pressure to lower the temperature of operation.

Figure 2:
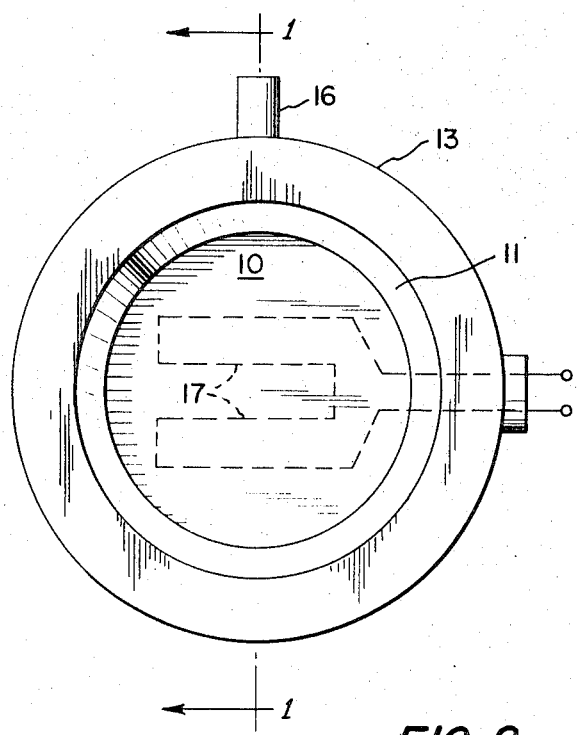
FIG. 2 is a front view of the device shown in FIG. 1.
Figure 4:
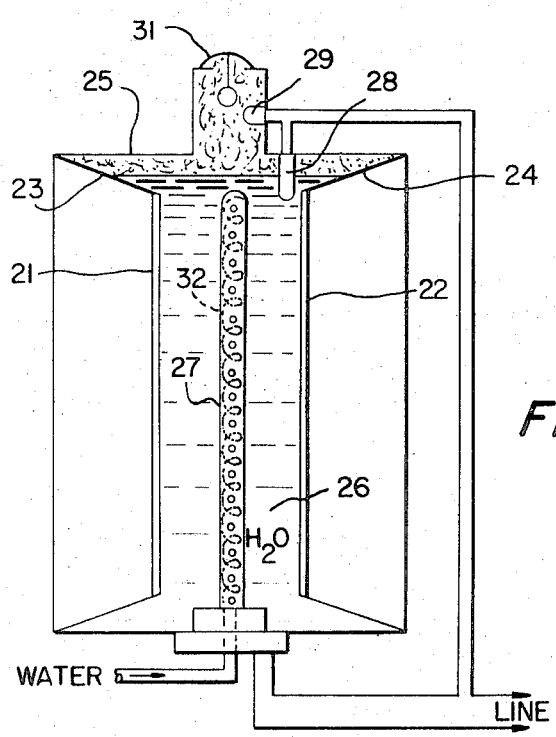
FIG. 4 illustrates a detector system having two sensitive detectors, one more sensitive than the other, with suitable solution heater, replenishing, and steam control means.

FIG. 4 illustrates a suitable unit which includes opposite detector elements 21 and 22. Each of these detector elements are shown secured to the inner small diameter end of a conical section 23 and 24 and the outer larger diameter end of the conical sections are secured to the ends of a cylindrical housing 25. The detector elements could be secured directly to the wall without use of the conical sections. The detector elements are made such that one detector element has a low sensitivity detector surface and the other has a high sensitivity detector surface. The surfaces are secured parallel with each other and spaced from each other to provide an area within which water 26 or any other suitable coolant is contained. The coolant also surrounds the conical sections within the spacing between the housing and the conical section. This device is provided with a heater 27, a water level switch 28 and a presure sensor 29, each of which are secured electrically in series into a circuit such that the pressure sensor and water level switch may control the heater if certain conditions prevail. As shown, the device also includes a pressure relief valve 31 which controls the pressure. The housing is provided with suitable means for replenishing the water as it boils away and the level switch is for the purpose of turning off the electric current to the heater if the water level gets too low. The water-inlet and heater could be made as a unit such that the water enters the chamber along the length of the heater element as shown in dotted lines 32. Thus, the water will be heated evenly across the diameter of the housing and will be preheated as it enters through the heater element. Once the water and detectors have reached maximum temperature and the device is operational such that the heat absorbed from the detectors and conical sections provide the heat source, the electric heater may be turned off. In this manner all of the heat resulting from the incident radiation will be absorbed by converting the water to steam as described above for the device shown in FIGS. 1 and 2. If the heating resulting from the radiation incident on the radiation detector element is not sufficient, a thermostatic controlled heater may be used to control the water temperature.

In operation of the device of FIG. 4, radiation of different intensity may be detected by either of the detectors depending on the desired sensitivity. The pressure relief valve may be controlled to determine the pressure at which the device will operate. Therefore, a pressure built-up greater than the setting of the pressure relief valve will result in steam being released.

Figure 5:
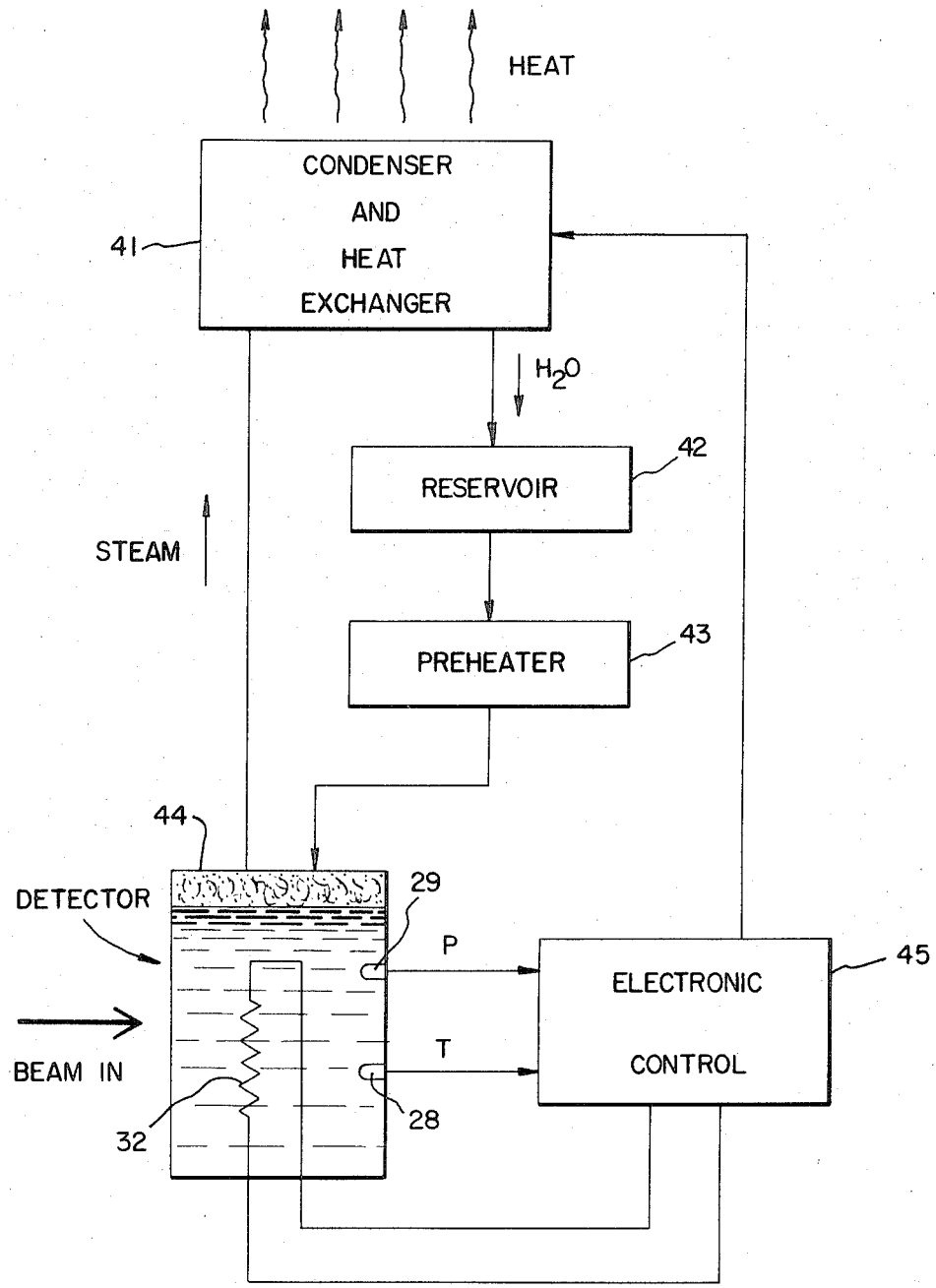
FIG. 5 is a simplified block diagram of a closed recirculating system for cooling a detector.

FIG. 5 illustrates a more elaborate system wherein steam generated by the detector system is directed to a condenser and heat exchanger 41 which dissipates the heat while converting the steam back to water. The water is directed to a reservoir 42 to which additional water may be added as necessary. From the reservoir, the water is directed to a preheater 43 where the water is preheated prior to entrance into the detector housing 44. The housing 44 is provided with suitable detectors, water heater pressure sensor switch and a water temperature control switch. An electronic control 45 is shown. The electronic control may also control the heat exchanger-condenser 41. Operation of this system is substantially the same as set forth above for the device of FIG. 4. In the device shown in FIG. 5, the heat absorbed from the detector due to incident radiation is carried to the condenser by the steam generated in the detector housing. This heat is dissipated by the heat exchanger and the recovered water is collected in the reservoir and recycled to the detector through the preheater as needed.

In order to minimize the hazards of high power radiation reflections, the conical section surface and base for the detector should be a black body at the radiation wavelength.

It is well known in steam generators that bubbles form along the heated surfaces which cut down on the heat transfer to the water. Therefore, the device may be provided with a wiper blade, jets or forced radial flow of the coolant which is used to wipe the water side of the detector base thereby wiping the bubbles away and allowing the water to be in contact with the detector base. Such a wiper on the inside of the chamber may be controlled through the housing by use of a mechanical means secured on the outside of the housing. If the wiper arrangement is not necessary it would make a more efficient operation.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A system for improving the operation and lifetime of a liquid crystal high energy radiation detector element which comprises,
   a housing,
   an opening in one wall of said housing,
   a radiation detector element support section,
   said support section secured within said opening in one wall of said housing,
   a liquid crystal radiation detector secured to said support section,
   an inlet into said housing for admitting a coolant solution into said housing,
   whereby said coolant in the housing surrounds the support section, said radiation detector and is in contact with the base of said radiation detector, and
   a heater secured within the confines of said housing for heating the solution to boiling temperature wherein the solution heats the radiation detector to the same temperature of the solution and provides a coolant for said radiation detector element during operation at higher temperatures.

2. A system as claimed in claim 1; which includes,
   a pressure relief valve on said coolant inlet into said housing,
   a pressure indicator to indicate the pressure within said housing, and
   an indicator to indicate the presence of sufficient coolant within said housing.

3. A system as claimed in claim 2; wherein,
   said pressure and coolant indicator are connected electrically in series with said heater to control operation of the heater.

4. A system as claimed in claim 3; which includes,
   a heat exchanger-condenser connected with said housing for dissipating heat while converting coolant vapors back to coolant,
   a reservoir for receiving the vapor converted coolant and
   a preheater chamber for preheating the coolant prior to entrance into the housing.

References Cited

UNITED STATES PATENTS 3,410,999  11/1968  Fergason et al. _____ 250—83.3 R

JAMES W. LAWRENCE, Primary Examiner

D. L. WILLIS, Assistant Examiner